DIGITALLY CONTROLLED AMPLITUDE MODULATION CIRCUIT

Filed Oct. 15, 1968 2 Sheets-Sheet 1

INVENTOR
HERMAN D. MAXEY
BY John B Frisone
ATTORNEY

Dec. 15, 1970 H. D. MAXEY 3,548,342

DIGITALLY CONTROLLED AMPLITUDE MODULATION CIRCUIT

Filed Oct. 15, 1968 2 Sheets-Sheet 2

United States Patent Office
3,548,342
Patented Dec. 15, 1970

3,548,342

DIGITALLY CONTROLLED AMPLITUDE MODULATION CIRCUIT

Herman D. Maxey, Raleigh, N.C., assignor to International Business Machines Corporation, Armonk, N.Y., a corporation of New York Filed Oct. 15, 1968, Ser. No. 767,754
Int. Cl. H03k 7/00
U.S. Cl. 332—9 5 Claims

ABSTRACT OF THE DISCLOSURE

A signal to be modulated is applied to a chopper circuit which passes the signal when turned "on" and blocks the signal when "off." A wave form generator supplies a plurality of asymmetric weighted control wave forms having a fixed period which are applied to the control input of the chopper via gate circuits under the control of a digital control signal. The chopper output is low pass filtered to pass only the signal frequencies. The weighting imposed by the digital control signal and the gated control wave forms determines the ratio of the chopper "on" to "off" time during each period of the control wave forms and thus the average signal amplitude passed by the chopper.

BACKGROUND OF THE INVENTION

Field of the invention

The invention relates to signal amplitude modulators and more particularly to amplitude modulators in which signal amplitude attenuation is controlled as a function of a digital control signal.

Description of the prior art

Pulse-ratio modulators have been used for amplitude modulation, however, they have been controlled by analog signals. In those instances where the control signals were provided in digital form, digital to analog converters were utilized for generating the analog control signal. In addition to cost, these converters were subject to drift and aging which contributed to inaccuracies. Other techniques employed weighted resistors in the signal path and digitally controlled switching networks for switching in the resistive attenuation as required. This technique is also expensive and subject to errors. The active switches introduced errors which are subject to variation and cannot be compensated.

INVENTION SUMMARY

The invention contemplates a direct digitally controlled pulse-ratio modulator in which a wave form generator provides a plurality of simultaneous asymmetric weighted control waves having a fixed period, said control waves having first and second weighted states, said second states occurring sequentially and substantailly without overlap, a plurality of gate means each responsive to one of the said wave forms, register means having a plurality of stages for receiving a digital control signal, each register stages controlling one of said gates as a function of the value stored in the register position, and modulating means responsive to the signal to be modulated and controlled by the weighted control waves applied via the register controlled gates whereby the average signal amplitude passed by the modulating means is a function of the digital signal stored in the register means.

One object of the invention is to provide a direct digitally controlled pulse-ratio modulator.

Another object of the invention is to provide a pulse-ratio modulator which is inexpensive to construct and is capable of very high accuracy.

The foregoing and other objects, features and advantages of the invention will be apparent from the following more particular description of preferred embodiments of the invention, as illustrated in the accompanying drawings.

DESCRIPTION OF THE PREFERRED EMBODIMENTS

Figure 1:
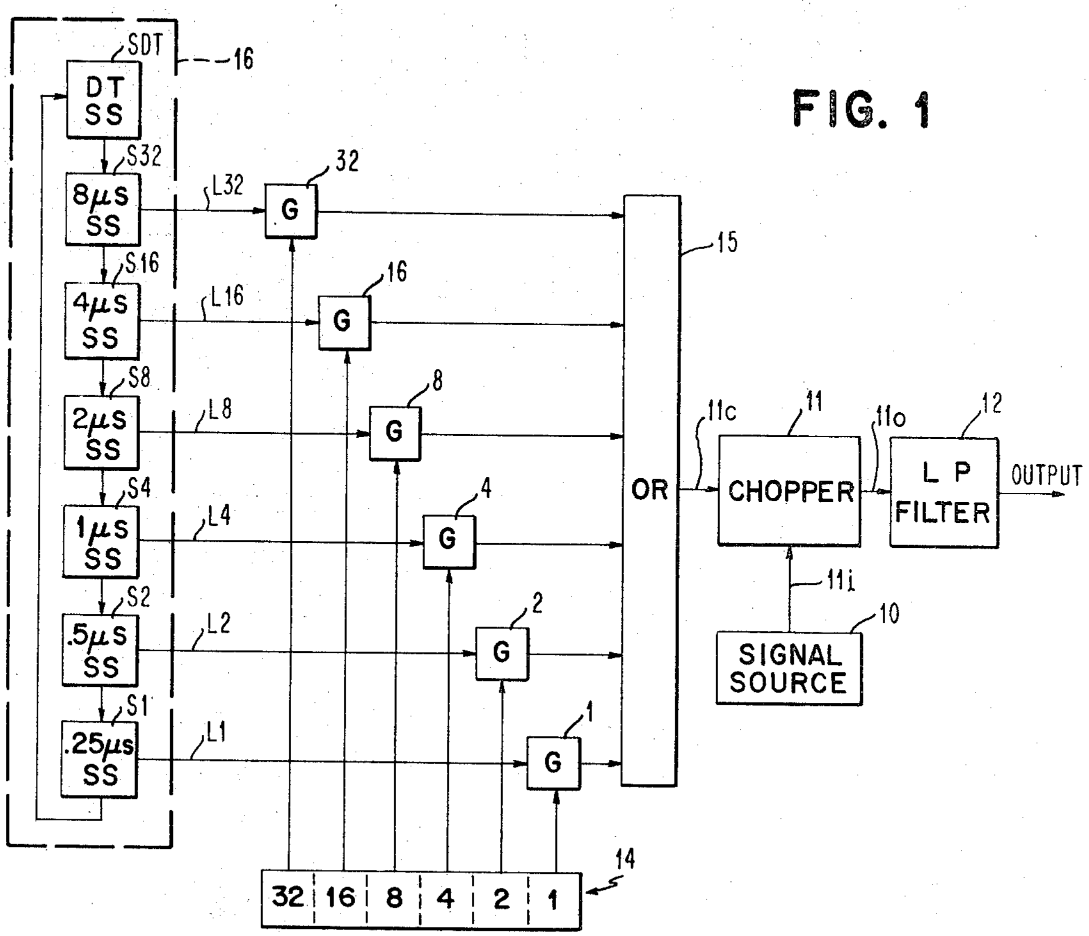
FIG. 1 is a block diagram of a novel digital pulse-ratio modulator constructed in accordance with the invention.

In FIG. 1, a signal or reference source 10 is connected to the input 11*i* of a chopper circuit 11 which has, in-addition, a control input 11*c* and an output 11*o*. Chopper circuit 11 passes the signal applied to the input 11*i* whenever the control input 11c is at a predetermined level. At all other times the signal applied to the input 11*i* is not passed onto the output 11*o*. A low pass filter 12 connected to the output of chopper circuit 11 passes only the signal frequencies from the source 10 and blocks all other frequencies, thus providing a smooth filtered output at the output of the filter circuit 12.

The "on," "off" ratio of the control input to chopper 11 is varied as a function of a digitally coded control signal. In the embodiment shown in FIG. 1, this digital signal is in binary form and is contained in a register 14. Register 14 is shown with six positions 1, 2, 4, 8, 16 and 32. Each of these position controls a gate G1, G2, G4, G8, G16 and G32 respectively. Thus when a register position is "one," the associated gate is enabled and when the register position is "zero," the associated gate is disabled. The outputs of gates G1 through G32 are connected to the inputs of an OR circuit 15 which has its output connected to the control input 11*c* of chopper 11.

Figure 2:
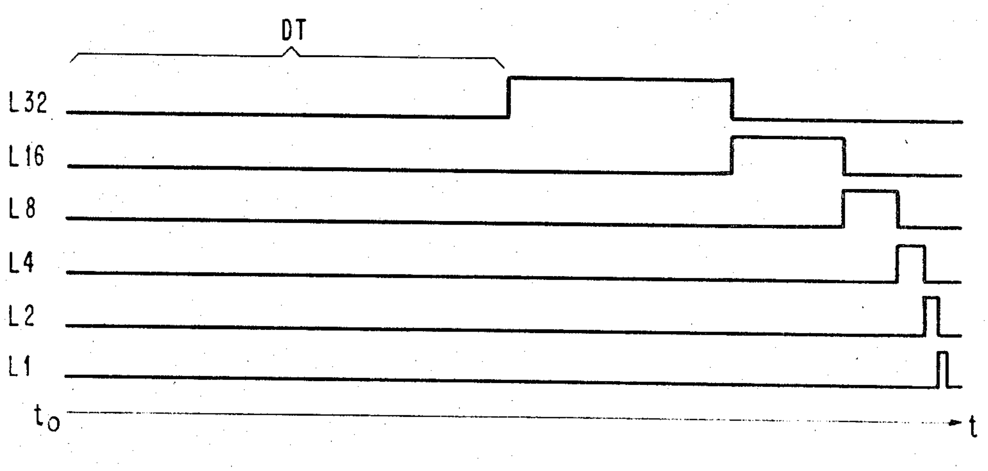
FIG. 2 is a graph illustrating wave forms generated by the circuit illustrated in FIG. 1.

A wave form generator 16 provides outputs L1, L2, L4, L8, L16 and L32 connected to the inputs of gates G1, G2, G4, G8, G16 and G32 respectively. The outputs L1 through L32 are shown graphically in FIG. 2. Each of the output lines L1 through L32 provides a wave form of the same fixed period which has a first and a second voltage level. The second voltage levels are binary weighted and occur sequentially, thus line 32 provides a positive voltage which continues in that state for a given time. Line 16 provides a positive voltage which occurs immediately after line 32 goes back to a more negative state and continues for half as long as the positive voltage on line 32. In a like manner lines L16, L8, L4, L2 and L1 provides a positive voltage for a time period one half the next higher order lines and each commences immediately after the previous line returns to the more negative state. The positive voltages passing through those gates enabled by register 14 are combined in OR circuit 15 and cause the chopper circuit 11 to remain open passing signal source 10. Thus, if register 14 is all "ones", gates G1 through G32 are enabled and following the period DT which is dead time period, the chopper will remain open for the remainder of the period illustrated in FIG. 2. If any position in register 14 is at a "zero," the chopper will be turned off during the time period in which the line associated with the gate connected to that register position is positive and the ratio of the chopper "on" to "off" time during each period of the control wave form is determined by the value inserted in register 14.

The dead period DT is provided so that the contents of register 14 may be changed during this period without effecting the signal through chopper 11. For example, if register 14 is changed from a decimal value 31 to a decimal value 32, the settling time for the various stages will differ. In the condition set forth, stage P32 will switch "on" and stages P1 through P16 will switch "off." If the switching occurs at different times, the chopper will be adversely affected. By providing the dead time, this adverse effect is avoided.

The wave form generator may take several forms. One form of the generator is illustrated in FIG. 1. In this form, a plurality of single shot circuits S1, S2, S4, S8, S16, S32 and SDT are utilized. These circuits are connected in a series loop. When the circuit is first turned on, a pluse is applied via circuits not shown to the single shot SDT. After the specified time delay provided by the circuit, the output level changes causing single shot circuit S32 to change state for the time period specified. In one embodiment of the invention, this was selected at eight microseconds; single shot S16 provided four microseconds output duration; single shot S8, two microseconds; single shot S4, one microsecond; single shot S2, .5 microsecond and single shot S1, .25 microsecond. Single shot SDT provided a total of 16 microseconds.

Figure 3:
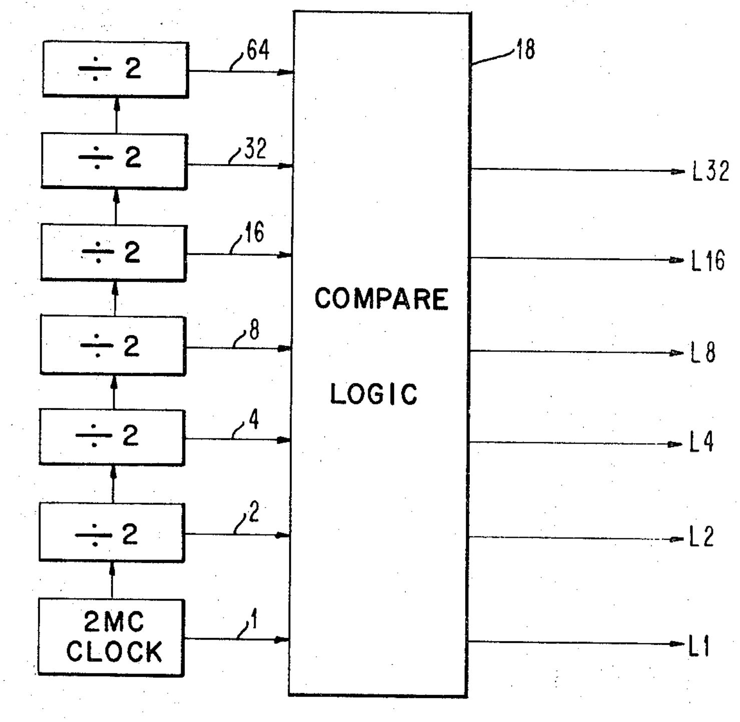
FIG. 3 is a block diagram of a modification of the circuit shown in FIG. 1; and, FIG. 4 is a detailed block diagram of the compare logic shown in block form in FIG. 3.

Another embodiment of the wave form generator is illustrated in FIG. 3. Here a two megacycle clock circuit is counted down in six successive binary stages and provides pulses having the ratios specified on the output lines 1, 2, 4, 8, 16, 32 and 64. These pulses are applied to compare logic circuitry 18 which provides the outputs L1, L2, L4, L8, L16 and L32 described in FIG. 1 and illustrated graphically in FIG. 2.

Figure 4:
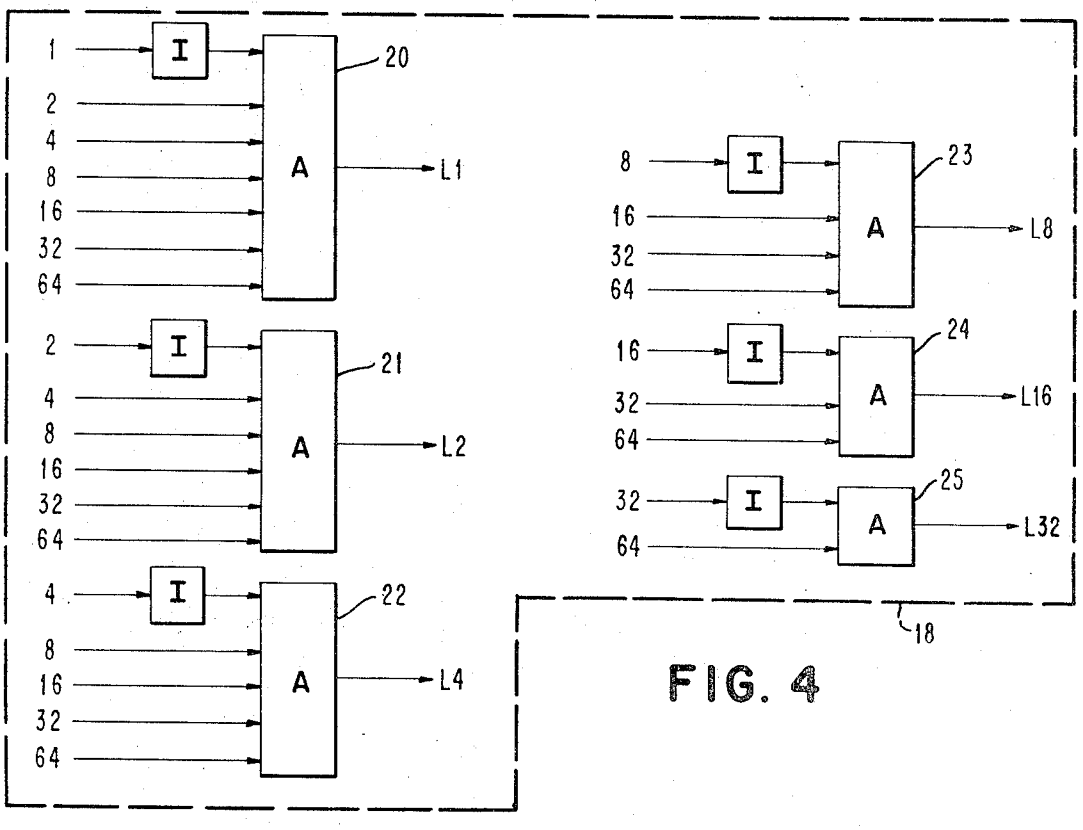

The details of compare logic circuit 18 are shown in FIG. 4. Here the outputs 1, 2, 4, 8, 16, 32 and 64 of FIG. 3 are applied to an AND circuit 20. The line 1 output from the two-megacycle clock is inverted. Thus AND circuit 20 provides a single pulse of half the period of the two megacycle clock. Lines 2, 4, 8, 16, 32 and 64 are applied to an AND circuit 21. Line 2 is inverted and AND circuit 21 provides a single pulse having half the period of the two-megacycle clock divided by two. In a like manner, lines 4, 8, 16, 32 and 64 are applied to an AND circuit 22; lines 8, 16, 32 and 64 are applied to an AND circuit 23; lines 16, 32 and 64 are applied to an AND circuit 24 and lines 32 and 64 are applied to an AND circuit 25. AND circuits 22, 23, 24 and 25 provide the outputs L4, L8, L16, and L32 respectively in a similar manner.

While the invention has been particularly shown and described with reference to preferred embodiments thereof, it will be understood by those skilled in the art that various changes in form and details may be made therein without departing from the spirit and scope of the invention.

What is claimed is:

1. A digital pulse-ratio modulator comprising;

a chopper having a signal input, a signal output and a control input for electrically connecting said signal input to said signal output whenever a control signal having a predetermined state is applied to said control input and electrically isolating said signal input from said signal output at other times;

a plurality of gate means each having an input, an output and a control input for connecting the input to the output when the control input assumes a predetermined state;

a control wave form generator for simultaneously providing a plurality of sequential asymmetric weighted control waves having the same period;

means connecting each control wave to the input of one of the gate means;

means connecting the gate means outputs to the chopper control input; and a digital control signal source connected to the control inputs of the gate means for enabling preselected gate means determined by the digital signal whereby the gated control wave forms determine the "on" to "off" ratio of the chopper and the resultant signal source attenuation.

2. A digital pulse-ratio modulator as set forth in claim 1 in which the digital control signals supplied are binarily coded, the control waves are binarily weighted, and each order of said control signal controls the gate means connected to the correspondingly weighted wave form.

3. A digital pulse-ratio modulator as set forth in claim 2 in which said wave form generator includes a plurality of single shot circuits having binary weighted periods and connected in a series loops, said single shot circuits providing the control waves.

4. A digital pulse-ratio modulator as set forth in claim 3 in which one of the single shot circuits is not connected to a gate means to thus provide a dead time during which the digital control signal may be modified if desired.

5. A digital pulse-ratio modulator as set forth in claim 2 in which said wave form generator includes an oscillator and a plurality of serially connected binary division circuits and logical circuit means responsive thereto for providing said wave forms.

References Cited

UNITED STATES PATENTS

| | | | |
|---|---|---|---|
| 2,478,919 | 8/1949 | Hansell | 332—9X |
| 2,680,153 | 6/1954 | Boothroyd et al. | 332—9X |
| 3,435,148 | 3/1969 | Yoshine | 332—11X |
| 3,358,068 | 12/1967 | Campbell | 328—62 |

FOREIGN PATENTS

| | | | |
|---|---|---|---|
| 1,460,565 | 10/1966 | France | 332—9 |

ALFRED L. BRODY, Primary Examiner

U.S. Cl. X.R.

325—39; 328—61, 156